United States Patent
Tran et al.

(10) Patent No.: US 10,349,216 B1
(45) Date of Patent: Jul. 9, 2019

(54) MOTION DETECTION FOR PASSIVE INDOOR POSITIONING SYSTEM

(71) Applicant: CISCO TECHNOLOGY, INC., San Jose, CA (US)

(72) Inventors: Huy Phuong Tran, Portland, OR (US); Abhishek Mukherji, Fremont, CA (US); Rong Peng, Mountain View, CA (US); Oscar Berjarano Chavez, Houston, TX (US); Santosh Ghanshyam Pandey, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/103,781

(22) Filed: Aug. 14, 2018

(51) Int. Cl.
| | |
|---|---|
| *H04W 4/02* | (2018.01) |
| *G06N 3/08* | (2006.01) |
| *H04W 84/12* | (2009.01) |
| *H04W 4/80* | (2018.01) |
| *H04W 4/029* | (2018.01) |
| *H04W 4/33* | (2018.01) |

(52) U.S. Cl.
CPC .............. *H04W 4/023* (2013.01); *G06N 3/08* (2013.01); *H04W 4/029* (2018.02); *H04W 4/33* (2018.02); *H04W 4/80* (2018.02); *H04W 84/12* (2013.01)

(58) Field of Classification Search
CPC ....... H04W 4/023; H04W 4/33; H04W 4/029; H04W 4/80; H04W 84/12; G06N 3/08
USPC .................................. 455/404.2, 456.1–457
See application file for complete search history.

(56) References Cited

U.S. PATENT DOCUMENTS

| | | | |
|---|---|---|---|
| 10,064,159 B1* | 8/2018 | Sung | H04W 64/006 |
| 10,080,098 B1* | 9/2018 | Edge | H04W 4/02 |
| 2010/0013639 A1* | 1/2010 | Revert | G01S 5/0294 340/572.1 |
| 2013/0176869 A1* | 7/2013 | Finlow-Bates | H04W 52/0254 370/252 |
| 2017/0280281 A1* | 9/2017 | Pandey | H04W 4/02 |
| 2017/0347228 A1* | 11/2017 | Kerai | H04W 4/80 |

\* cited by examiner

*Primary Examiner* — Michael Y Mapa
(74) *Attorney, Agent, or Firm* — Johnson, Marcou & Isaacs, LLC

(57) ABSTRACT

An enterprise system configures access point devices at an enterprise location to communicate with a location determination system. The location determination system receives wireless signal attributes of user computing devices broadcasting Wi-Fi signal data at the enterprise location from one or more access point devices. For a particular time window, the location determination system determines aggregated features of received wireless signal data across all access point devices, and classifies each of the user computing devices as moving or stationary by applying the wireless signal data to a model. For each of the user computing devices determined to be moving, the location determination system calculates a respective position of the user computing device based on the wireless signal data. For each of the user computing devices determined to be stationary, the location determination system does not calculate a respective position of the respective user computing device.

20 Claims, 8 Drawing Sheets

230

Receiving, by a location determination system, wireless signal attributes of user computing device from an access point device

410

Access point receives Wi-Fi signal data from user computing device via Wi-Fi communication channel

420

Access point determines wireless signal attributes of user computing device based on the Wi-Fi signal data received from the user computing device

430

Access point transmits wireless signal attributes of user computing device to location determination system via network

440

Location determination system receives wireless signal attributes of user computing device from access point via network 240, Fig. 2

Figure 4

12" fill="#E5E7EB"/>
MOTION DETECTION FOR PASSIVE INDOOR POSITIONING SYSTEM

TECHNICAL FIELD

The present disclosure relates generally to indoor positioning systems and, more particularly, to determining user computing device position based on wireless signal data of user computing devices.

BACKGROUND

Large scale positioning systems that track thousands of devices and leverage hundreds of Access Points ("AP") have become an extremely critical component of real world wireless deployments. Customer engagement, asset tracking and indoor navigation are some concrete applications that can leverage indoor positioning systems. These positioning systems may use angle-of-arrival ("AoA") and/or received signal strength indication ("RSSI") measurements to achieve a location accuracy to within one to three meters, each location computation is typically expensive. Inertial sensor data, conventionally used to detect motion of user computing devices, is typically not available to location determination systems. As users are often stationary for a considerable amount of time in enterprise setups (workplaces, hospitals, etc.), positioning systems unnecessarily recompute location computations. As such, existing indoor positioning systems have provided considerable accuracy, but limited scalability and coverage Current applications for determining user computing device position do not provide for efficient positioning based on movement classification.

SUMMARY

Techniques herein provide computer-implemented methods to determine locations of user computing devices based on wireless signal data received at access points and movement classification. In an example, an enterprise system configures access point devices at an enterprise location to communicate with a location determination system via a network and to receive Wi-Fi signal data via wireless communication channels. One or more users configure respective user computing devices to broadcast Wi-Fi signal data at the enterprise location. The location determination system receives wireless signal attributes of user computing devices broadcasting Wi-Fi signal data at the enterprise location from the one or more access point devices via the network. For a particular time window, the location determination system receives wireless signal attributes of user computing devices over a time window from the one or more access point devices, aggregates the received wireless signal attributes, and determines if each of the user computing devices is moving or stationary by applying the aggregated wireless signal attributes to a model. For each of the user computing devices determined to be moving, the location determination system calculates a respective position of the user computing device based on the wireless signal data associated with the respective user computing device and displays the determined position via a user interface. For each of the user computing devices determined to be stationary, the location determination system does not calculate a respective position of the respective user computing device. The location determination continues to receive wireless signal attributes via the network from the one or more computing devices at the enterprise location that continue to broadcast Wi-Fi signal data and continues to determine locations of user computing devices based on the movement classification.

In certain other example aspects described herein, systems and computer program products to determine locations of user computing devices based on wireless signal data received at access points and movement classification are provided.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

FIG. 4 is a block flow diagram depicting a method to receive, by a location determination system, wireless signal data of a user computing device from an access point device, in accordance with certain examples.

DESCRIPTION OF EXAMPLE EMBODIMENTS

Overview

The example embodiments described herein provide computer-implemented techniques to determine locations of user computing devices based on wireless signal data received at access points and movement classification.

In an example, an enterprise system configures access point devices at an enterprise location to communicate with a location determination system via a network and to receive Wi-Fi signal data via wireless communication channels. One or more users configure respective user computing devices to broadcast Wi-Fi signal data at the enterprise location. The location determination system receives wireless signal attributes of user computing devices broadcasting Wi-Fi signal data at the enterprise location from the one or more access point devices via the network. For a particular time window, the location determination system receives wireless signal attributes of user computing devices over a time window from the one or more access point devices, aggregates the received wireless signal attributes, and determines if each of the user computing devices is moving or stationary by applying the aggregated wireless signal attributes to a model. For each of the user computing devices determined to be moving, the location determination system calculates a respective position of the user computing device based on the wireless signal data associated with the respective user computing device and displays the determined position via a user interface. For each of the user computing devices determined to be stationary, the location determination system does not calculate a respective position of the respective user computing device. The location determination continues to receive wireless signal attributes via the network from the one or more computing devices at the enterprise location that continue to broadcast Wi-Fi signal data and continues to determine locations of user computing devices based on movement classification.

By using and relying on the methods and systems described herein, a network system may detect motion of user computing devices by comparing phase vectors and RSSI data determined from Wi-Fi signals of the user computing devices received at one or more access points. The systems and methods herein provide new motion detection models that exploit variation and temporal spatial relationships of measurements with device motion and achieve considerable accuracy while incurring negligible computational overhead. As such, the systems and methods herein provide computational savings with negligible impact on location accuracy.

Various examples will be explained in more detail in the following description, read in conjunction with the figures illustrating the program flow.

Turning now to the drawings, in which like numerals represent like (but not necessarily identical) elements throughout the figures, example embodiments are described in detail.

System Architecture

Figure 1:
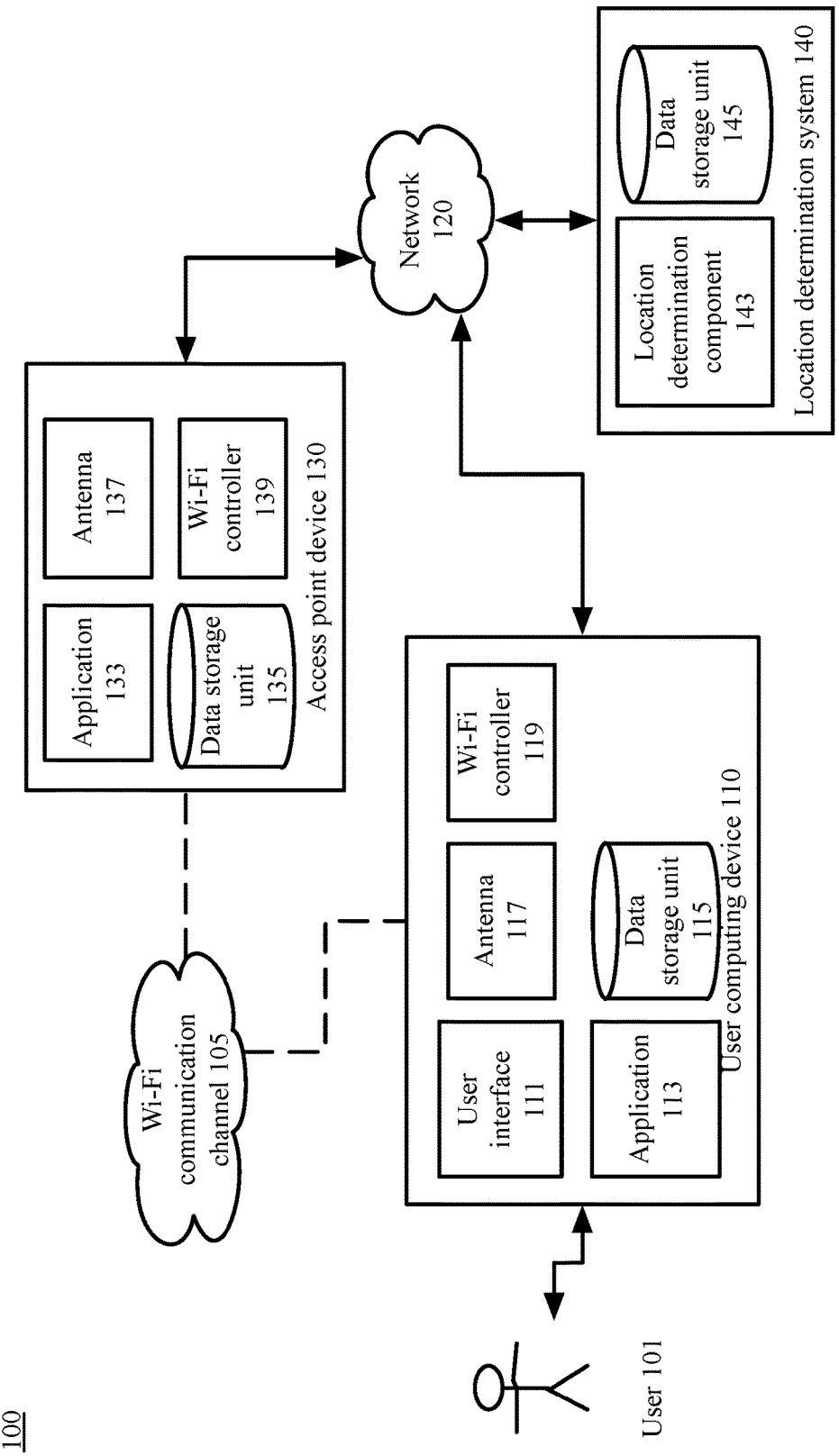
FIG. 1 is a diagram depicting an example system to determine locations of user computing devices based on wireless signal data received at access points and movement classification, in accordance with certain examples.

FIG. 1 is a block diagram depicting a system 100 to determine locations of user computing devices 110 based on wireless signal data received at access points and movement classification, in accordance with certain examples. As depicted in FIG. 1, the system 100 comprises network computing devices 110, 130, 140, and 150 that are configured to communicate with one another via one or more networks 120. In some embodiments, a user associated with a device must install an application and/or make a feature selection to obtain the benefits of the techniques described herein.

In examples, the network 120 comprises a wired or wireless telecommunication mechanism by which network systems (including systems 110, 130, and 140) can communicate and exchange data. For example, each network 120 can include, be implemented as, or may be a part of, a storage area network (SAN), personal area network (PAN), a metropolitan area network (MAN), a local area network (LAN), a wide area network (WAN), a wireless local area network (WLAN), a virtual private network (VPN), an intranet, an Internet, a mobile telephone network, a card network, Bluetooth, Bluetooth Low Energy (BLE), near field communication network (NFC), any form of standardized radio frequency, infrared, sound (for example, audible sounds, melodies, and ultrasound), other short range communication channel, or any combination thereof, or any other appropriate architecture or system that facilitates the communication of signals, data, and/or messages (generally referred to as data). Throughout this specification, it should be understood that the terms "data" and "information" are used interchangeably herein to refer to text, images, audio, video, or any other form of information that can exist in a computer-based environment In an example, each network system (including systems 110, 130, and 140) comprises a device having a communication module capable of transmitting and receiving data over the network 120. For example, each network system (including systems 110, 130, and 140) may comprise a server, personal computer, mobile device (for example, notebook computer, handheld computer, tablet computer, netbook computer, personal digital assistant (PDA), video game device, GPS locator device, cellular telephone, Smartphone, or other mobile device), a television with one or more processors embedded therein and/or coupled thereto, an appliance with one or more processors embedded therein and/or coupled thereto, or other appropriate technology that comprises or is coupled to a web browser or other application for communicating via the network 120. In the example depicted in FIG. 1, the network systems (including systems 110, 130, and 140) are operated by users 101, access point device 130 operators, and location determination system 140 operators, respectively.

An example user computing device 110 comprises a user interface 111, an application 113, a data storage unit 115, an antenna 117, and a microphone component 119. In an example, the user computing device 110 communicates with a location determination system 140 via the network 120. In an example, the user computing device 110 broadcasts data via a wireless communication channel, for example, a Wi-Fi communication channel 105 such that nearby access point devices 130 may receive the broadcast data via the wireless communication channel. In an example, the user computing device 110 receives data over a wireless communication channel, for example, a Wi-Fi communication channel 105, from one or more access point devices 130 associated with the location determination system 140. In this example, the user computing device 110 transmits data over a wireless communication channel, for example, a Wi-Fi communication channel 105, to one or more access point devices 130 associated with the location determination system 140.

In an example, the user interface 111 enables the user 101 to interact with the user computing device 110. For example, the user interface 111 comprises a touch screen, a voice-based interface, or any other interface that allows the user 101 to provide input and receive output from an application 113 on the user computing device 110. In an example, the user 101 interacts via the user interface 111 with the application 113. In an example, the user 101 may log into the application 113 by selecting the application 113 via the user computing device 110 and/or by entering a user 101 name and password via the user interface 111.

In an example, the application 113 is a program, function, routine, applet, or similar entity that exists on and performs its operations on the user computing device 110. In certain examples, the user 101 must install the application 113 and/or make a feature selection on the user computing device 110 to obtain the benefits of the techniques described herein. In an example, the user 101 accesses the application 113 on the user computing device 110 via the user interface 111. In an example, the application 113 is associated with the location determination system 140. In an example, the application 113 comprises a payment application or wallet application. In another example, the application 113 comprises a ticketing application. In yet another example, the application 113 comprises an email application, a mapping application, a shopping application, a social media application, or other application. In an example, the user computing device 110 broadcasts data, for example, a user computing device 110 network identifier, via the Wi-Fi communication channel 105 when the user 101 is signed in to the application. In other examples, the user computing device 110 broadcasts data via the Wi-Fi communication channel 105 based on one or more configurations of the user computing device 110 set by the user 110 via the user interface 111. In certain examples, the user computing device 110 does not comprise an application 113 or the user 101 does not download an application 113 onto the user computing device 110 via the network 120. In certain examples, one or more functions described herein as performed by the application 113 or performed via the application 113 are performed via the user computing device 110 operating system.

In an example, the data storage unit 115 comprises a local or remote data storage structure accessible to the user computing device 110 suitable for storing information. In an example, the data storage unit 115 stores encrypted information, such as HTML5 local storage.

In an example, the antenna 117 is a means of communication between the user computing device 110 and an access point device 130. In an example embodiment, a Wi-Fi controller 119 outputs through the antenna 117 a radio signal, or listens for radio signals from the access point device 130. In another example, embodiment a Bluetooth controller or a near field communication ("NFC") controller is used.

In an example, the Wi-Fi controller 119 is capable of sending and receiving data, performing authentication and ciphering functions, and directing how the user computing device 110 will listen for transmissions from the access point device 130 or configuring the user computing device 110 into various power-save modes according to Wi-Fi-specified procedures. In another example embodiment, the user computing device 110 comprises a Bluetooth controller or an NFC controller capable of performing similar functions. An example Wi-Fi controller 119 communicates with an application 113 and is capable of sending and receiving data over a wireless, Wi-Fi communication channel 105. In another example embodiment, a Bluetooth controller 119 or NFC controller 119 performs similar functions as the Wi-Fi controller 119 using Bluetooth or NFC protocols. In an example embodiment, the Wi-Fi controller 119 activates the antenna 117 to create a wireless communication channel between the user computing device 110 and the access point device 130. The user computing device 110 communicates with the access point device 130 via the antenna 117. In an example embodiment, when the user computing device 110 has been activated, the Wi-Fi controller 119 polls through the antenna 117 a radio signal, or listens for radio signals from the access point device 130.

An example access point device 130 comprises an application 133, a data storage unit 135, an antenna 137, and a Wi-Fi controller 139. In certain examples, the access point device 130 comprises a beacon device or a mobile computing device such as a smartphone device, tablet device, or other mobile computing device. In an example, the access point device 130 receives data broadcast by one or more user computing devices 110 via the Wi-Fi communication channel 105. In other examples, the access point device 130 communicates data to the user computing device 110 via the Wi-Fi communication channel. In another example, the access point device 130 communicates with the user computing device 110 via the network 120. In an example, the access point device 130 communicates with the location determination system 140 via the network 120 to send data to the location determination system 140. In an example, the access point device 130 communicates with the location determination system 140 via the network 120 to receive data from the location determination system 140. In an example, a location associated with the location determination system 140 comprises multiple access point devices 130 that communicate with the location determination system 140 via the network 120. In this example, each of the multiple access point devices 130 receives data broadcast by multiple user computing devices 110 over Wi-Fi communication channels 105.

In an example, the application 133 is a program, function, routine, applet, or similar entity that exists on and performs its operations on the access point device 130. In certain example embodiments, the access point device 130 operator or other location determination system 140 must install the application 133 and/or make a feature selection on the access point device 130 to obtain the benefits of the techniques described herein. In an example embodiment, the access point device 130 operator may access the application 133 on the access point device 130 via a user interface. In an example embodiment, the application 133 may be associated with the location determination system 140. In another example embodiment, the application 133 may be associated with a system otherwise associated with the access point device 130.

In an example, the data storage unit 135 comprises a local or remote data storage structure accessible to the access point device 130 suitable for storing information. In an example, the data storage unit 135 stores encrypted information, such as HTML5 local storage.

In an example, the antenna 137 is a means of communication between the access point device 130 and one or more user computing devices 110. In an example embodiment, a Wi-Fi controller 139 outputs through the antenna 137 a radio signal, or listens for radio signals from one or more user computing devices 110 at a location. In another example embodiment a Bluetooth controller or a near field communication ("NFC") controller is used. In an example embodiment, the Wi-Fi controller 139 outputs through the antenna 137 a radio signal, or listens for radio signals from the one or more user computing devices 110. In an example, the antenna 137 comprises an antenna array. In an example, the antenna 137 comprises a highly directional antenna 137 that rotates, enabling the user computing device 110 to determine an angle of arrival ("AOA") of received Wi-Fi signal data.

In an example, the Wi-Fi controller 139 is capable of sending and receiving data, performing authentication and ciphering functions, and directing how access point device 130 will listen for transmissions from one or more user computing devices 110 at a location or configuring the access point device 130 into various power-save modes according to Wi-Fi-specified procedures. In another example embodiment, the access point device 130 comprises a Bluetooth controller or an NFC controller capable of performing similar functions. An example Wi-Fi controller 139 communicates with the application 133 and is capable of sending and receiving data over a wireless, Wi-Fi communication channel 105. In another example embodiment, a Bluetooth controller 139 or NFC controller 139 performs similar functions as the Wi-Fi controller 139 using Bluetooth or NFC protocols. In an example embodiment, the Wi-Fi controller 139 activates the antenna 137 to create a wireless communication channel between each of the one or more user computing devices 110 and the access point device 130. The access point device 130 communicates with the user computing device 110 via the antenna 137. In an example embodiment, when the access point device 130 has been activated, the Wi-Fi controller 139 polls through the antenna 137 a radio signal, or listens for radio signals from the one or more user computing devices 110.

An example location determination system 140 comprises a location determination component 143 and a data storage unit 145. In an example, the location determination system 140 communicates with the user computing device 110 and the access point device 130 via the network 120.

In an example, the location determination component 143 receives wireless signal attribute data from one or more access point devices 130 via a network 120. In an example, the location determination component 143, based on the received wireless signal attribute data from the one or more access point devices 130 classifies each of one or more user computing devices 110 as "moving" or stationary." In an example, the location determination component 143 calculates a position for each user computing device 110 classified as "moving" and does not calculate a position for each user computing device 110 classified as "stationary."

In an example, the data storage unit 145 comprises a local or remote data storage structure accessible to the location determination system 140 suitable for storing information. In an example, the data storage unit 145 stores encrypted information, such as HTML5 local storage.

Figure 8:
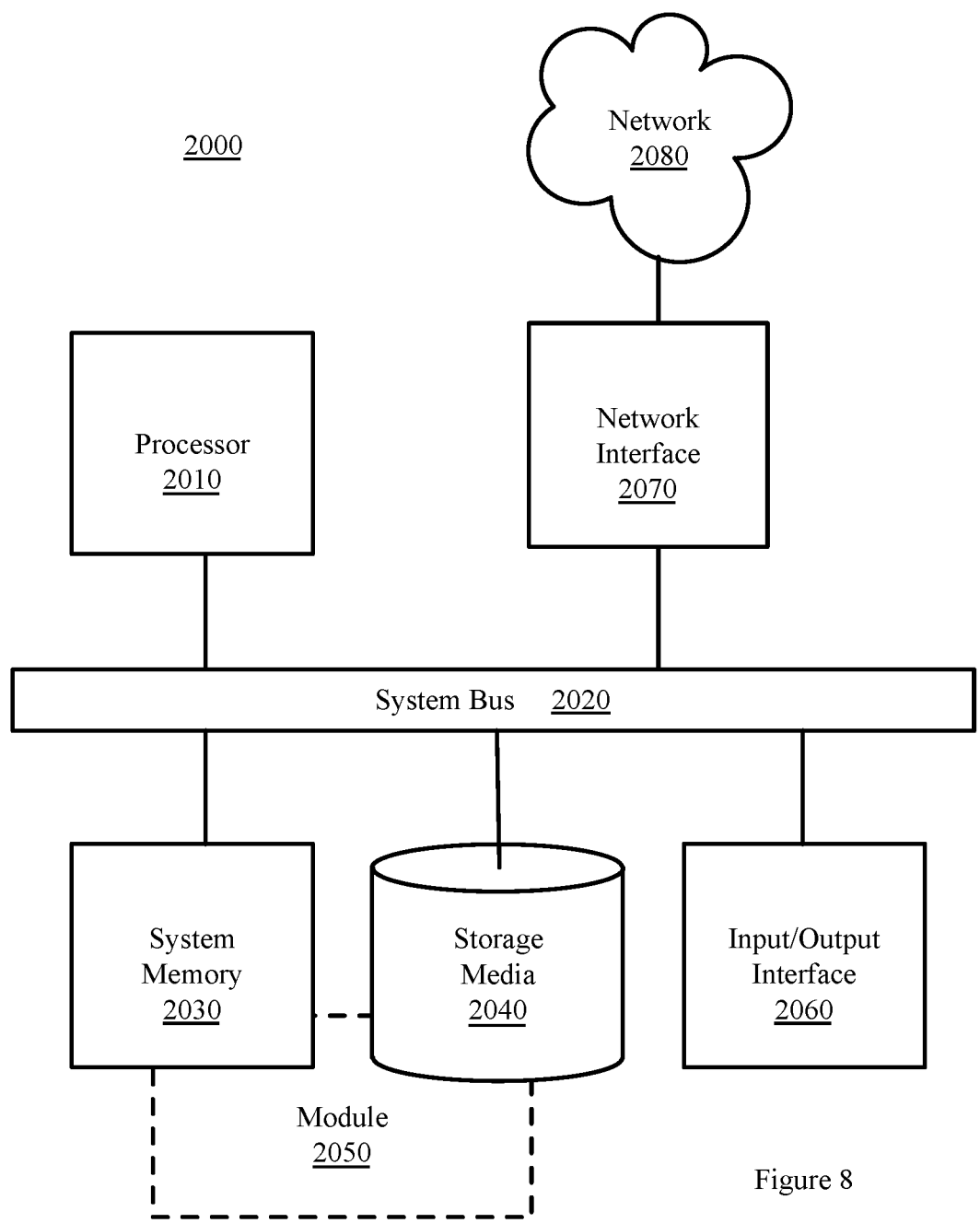
FIG. 8 is a block diagram depicting a computing machine and module, in accordance with certain examples.

In examples, the network computing devices and any other computing machines associated with the technology presented herein may be any type of computing machine such as, but not limited to, those discussed in more detail with respect to FIG. 8. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 8. The computing machines discussed herein may communicate with one another, as well as with other computing machines or communication systems over one or more networks, such as network 120. The network 120 may include any type of data or communications network, including any of the network technology discussed with respect to FIG. 8.

Example Processes

The example methods illustrated in FIGS. 2-5 are described hereinafter with respect to the components of the example operating environment 100. The example methods of FIGS. 2-5 may also be performed with other systems and in other environments. The operations described with respect to any of the FIGS. 2-5 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Figure 2:
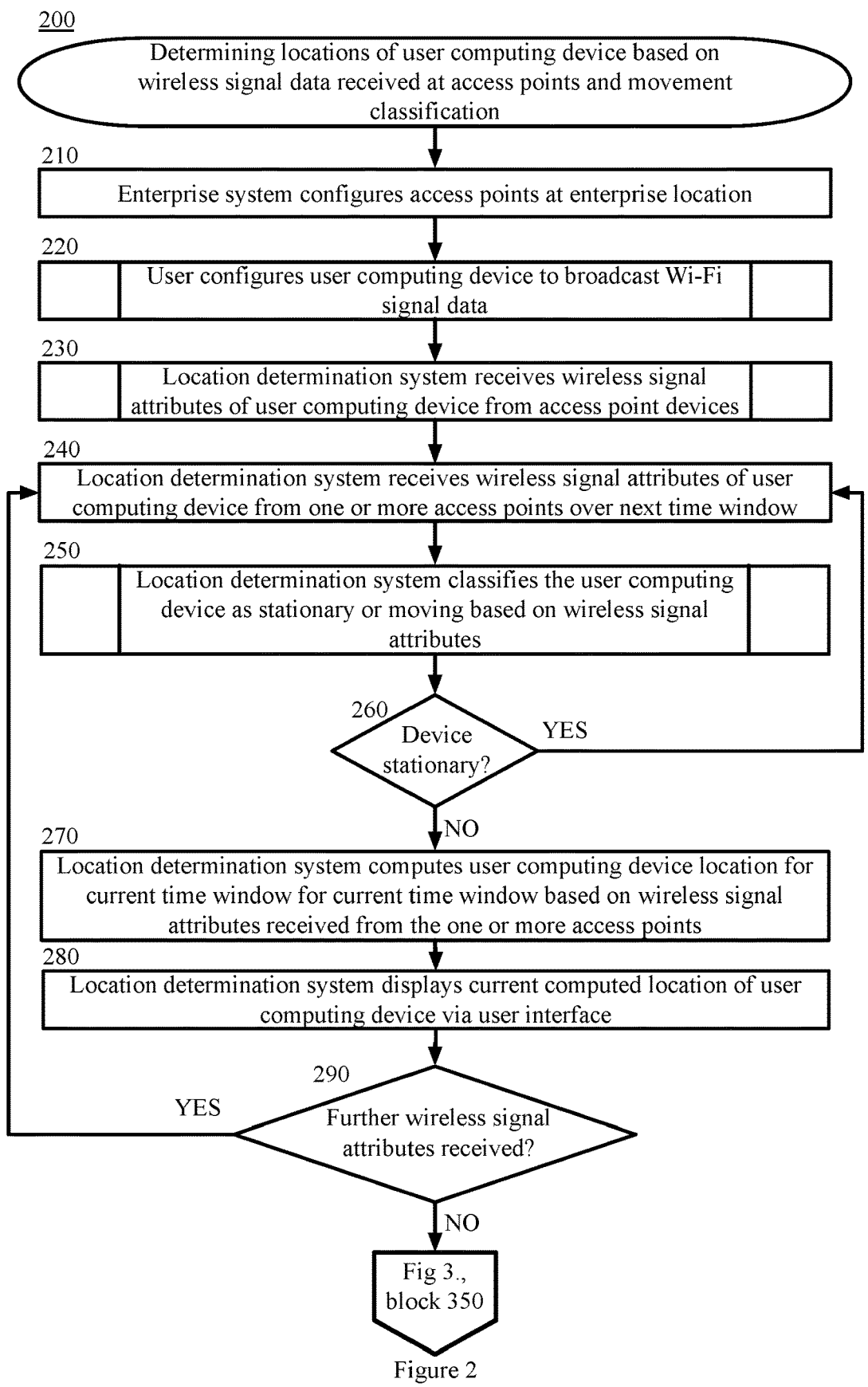
FIG. 2 is a block flow diagram depicting a method to determine locations of user computing devices according to motion classification based on wireless signal data received at access point devices, in accordance with certain examples.

FIG. 2 is a block diagram depicting a method 200 for to determine locations of user computing devices 110 according to motion classification based on wireless signal data received at access point devices 130, in accordance with certain examples. The method 200 is described with reference to the components illustrated in FIG. 1.

In block 210, an enterprise system configures access point devices 130 at an enterprise location. In an example, an enterprise location comprises a multi-floored office building, a transit station, a school, a stadium, a train, an airplane, a ship, or other location associated with the enterprise system and comprising multiple access point devices 130. In an example, the enterprise system configures the access point devices 130 to communicate over a network 120 with a location determination system 140. Further, in this example, the enterprise system configures the access point devices 130 to receive data via Wi-Fi communication channels 105 at the enterprise location. For example, the access point devices 130 are configured to receive Wi-Fi signal data broadcast by one or more user computing devices 110 at the enterprise location. In an example, the access point devices 130 are configured to transmit received Wi-Fi signal data to the location determination system 140 via the network 120. In certain examples, the enterprise system comprises the location determination system 140 or otherwise communicates with the location determination system 140 via the network 120. In an example, each access point device 130 comprises a respective access point device 130 identifier that identifies the respective access point device 130 and each access point device 130 is associated with a specific location within the enterprise location where the respective access point device 130 is located. In an example, the enterprise system accesses a location determination system 140 website and downloads an application 133 on each access point device 130. In other examples, the enterprise system purchases or otherwise acquires the access point devices 130 from the location determination system 140, and the access point devices 130 already have an application 133 pre-installed on each of the access point devices 130. In an example, the application 133 communicates with the location determination system 140 via the network 120.

In block 220, the user 101 configures the user computing device 110 to broadcast data via a wireless communication channel 105. The method to configure the user computing device 110 to broadcast data via a wireless communication channel 105 is described in more detail hereinafter with reference to the method described in FIG. 3. In an example, multiple users 101 configure respective user computing devices 110 using the method described in FIG. 3 and enter an enterprise location with the user computing devices 110. For example, multiple employees at an enterprise location configure respective employer-provided user computing devices 110 using the method described in FIG. 3.

Figure 3:
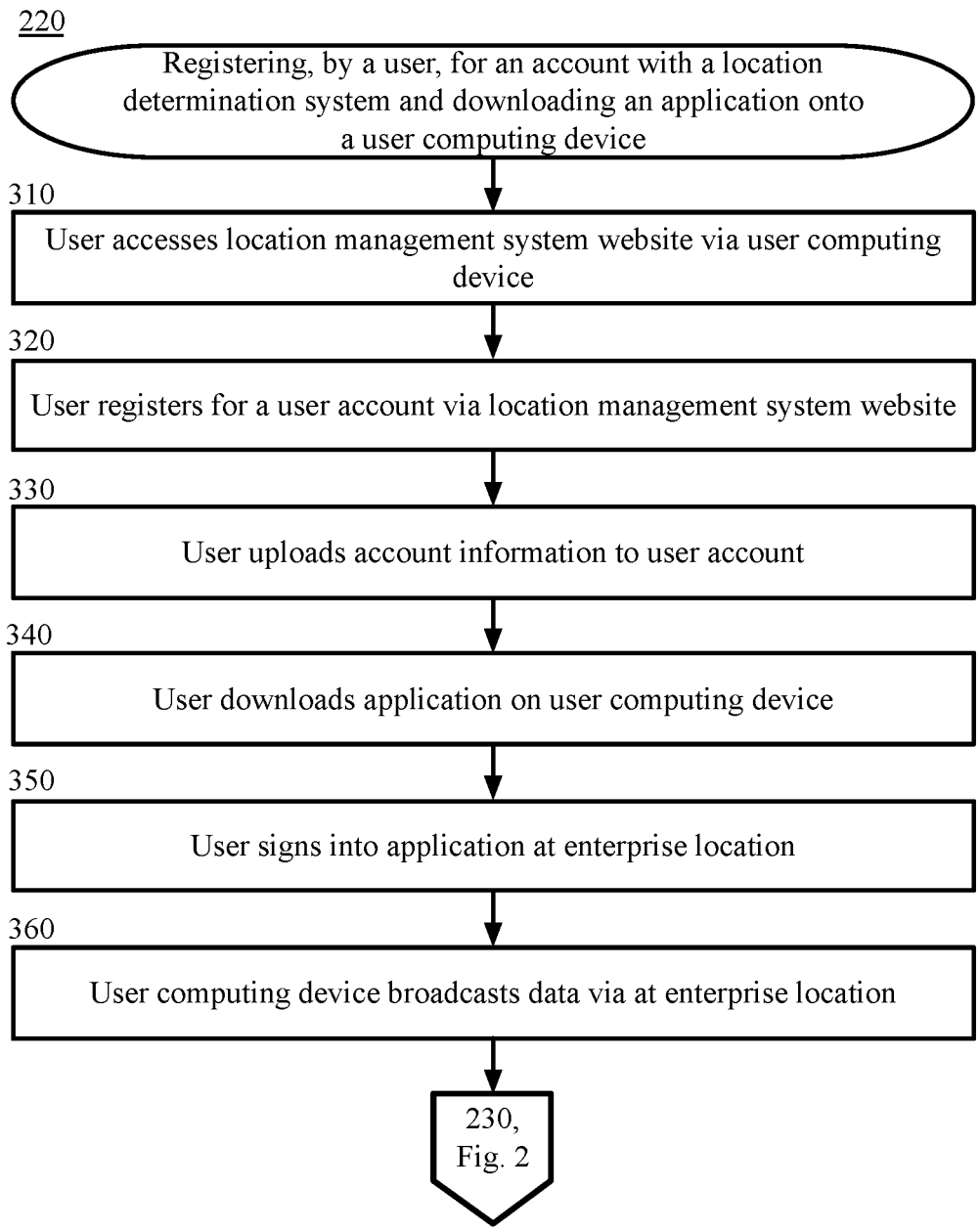
FIG. 3 is a block flow diagram depicting a method to register, by a user, for an account with a location determination system and downloading an application onto a user computing device, in accordance with certain examples.

FIG. 3 is a block diagram depicting a method 220 to configure the user computing device 110 to broadcast data via a wireless communication channel 105, in accordance with certain examples. The method 220 is described with reference to the components illustrated in FIG. 1.

In block 310, the user 101 accesses a location determination system 140 website via the user computing device 110. In an example, the user 101 enters the website 143 address into a web browser 112 of the user computing device 110 or otherwise accesses the website 143 via the user interface 111 of the user computing device 110. In an example, the user 101 actuates a user interface 111 object on an advertisement on the web browser 112 and the web browser 112 redirects to the website 143.

In block 320, the user 101 registers for a user 101 account via the location determination system 140 website. The user 101 may obtain a user 101 account number, receive the appropriate applications and software to install on the user computing device 110, request authorization to participate transaction processing, or perform any action required by the location determination system 140. The user 101 may utilize the functions of the user computing device 110, such as the user interface 111 and a web browser, to register and configure a user 101 account. In an example, the user 101 may enter payment account information associated with one or more user 101 accounts, for example, one or more credit accounts, one or more bank accounts, one or more stored value accounts, and/or other appropriate accounts into the user 101 account maintained by the location determination system 140. In an example, the location determination system 140 generates a network identifier for the user computing device 110, associates the network identifier with the respective user computing device 110, and transmits the network identifier to the user computing device 110 application 113 via the network 120.

In block 330, the user 101 uploads account information to the user 101 account. In an example, the user 101 may configure user 101 account settings or add, delete, or edit payment account information via the location determination system website 143. In an example, the user 101 may select an option to enable or disable the permission of the location determination system 140 to process transactions. For example, the payment account information comprises an account number, an expiration date, an address, a user 101 account holder name, or other information associated with the user 101 payment account that would enable the location determination system 140 to process a payment transaction.

In block 340, the user 101 downloads an application 113 onto the user computing device 110. In an example, the user 101 selects an option on the location determination system 140 website 143 to download an advertising application 113 onto the user computing device 110. In an example, the advertising application 113 operating on the user computing device 110 is able to communicate with the location determination system 140 over the network 120. In an example, the advertising application 113 operating on the user computing device 110 is able to communicate with the location determination system 140 over the network 120 when the user 101 is signed in to the advertising application 113.

In block 350, the user 101 signs into the application 113 at the enterprise location. For example, the user 101 selects the application 113 via the user computing device 110 to sign in to the application 113. In another example, the user 101 selects the application via the user interface 111 and enters a user name and password. In an example, the user 101 signs in to the application 113 before entering the enterprise location, after entering the enterprise location, or while entering the enterprise location.

In block 360, the user computing device 110 broadcasts data at the enterprise location. For example, the user computing device 110 sends radio frequency signals comprising Wi-Fi signal data in a scan for access point devices 130. In certain examples, the radio frequency signal data comprises one or more of Wi-Fi signal data, Bluetooth signal data, Bluetooth low energy ("BLE") signal data, near field communication ("NFC") signal data, and other signal data. In an example, in response to the user 101 signing in to the application 113, the application broadcasts Wi-Fi signal data of the user computing device 110 via a Wi-Fi communication channel 105 at the enterprise location. In an example, the user computing device 110 broadcasts Wi-Fi signal data comprising a user computing device 110 network identifier. In an example, the user computing device 110 network identifier previously generated by the location determination system 140. In an example, the user computing device 110 broadcasts Wi-Fi signal data via the wireless communication channel 105 at the enterprise location such that other computing devices at the enterprise location, including one or more access point devices 130, may receive the broadcast Wi-Fi signal data.

In certain examples, the user 101 does not download an application 113 onto the user computing device 110 and does not sign into the application 113 for the user computing device 110 to broadcast data. In certain examples, the user 101 configures, via the user interface 111, one or more settings of the user computing device 110 so that the user computing device 110 broadcasts Wi-Fi signal data via wireless communication channels 105 at the enterprise location. In other examples, the user computing device 110 is configured to continually or periodically broadcast Wi-Fi signal data in accordance with one or more default settings.

From block 360, the method 220 proceeds to block 230 in FIG. 2.

Returning to FIG. 2, in block 230, the location determination system 140 receives wireless signal attributes of the user computing device 110 from the access point device 130. The method 230 to receive, by a location determination system 140, wireless signal data of a user computing device 110 from an access point device 130 is described in more detail hereinafter with reference to the method described in FIG. 4.

FIG. 4 is a block diagram depicting a method 230 to receive, by a location determination system 140, wireless signal data of a user computing device 110 from an access point device 130, in accordance with certain examples. The method 230 is described with reference to the components illustrated in FIG. 1. The method described herein is from the perspective of a single access point device 130. However, in certain examples, multiple access point devices 130 receive Wi-Fi signal data from one or more user computing devices 110 via Wi-Fi communication channels 105 and retransmit the Wi-Fi signal data received from the one or more user computing devices 110 to the location determination system 140 via the network 120.

In block 410, the access point device 130 receives Wi-Fi signal data from the user computing device 110 via the Wi-Fi communication channel 105. For example, when the access point device 130 has been activated, the Wi-Fi controller 139 polls through the antenna 137 a radio signal, or listens for radio signals broadcast by the one or more user computing devices 110. Example Wi-Fi signal data comprises the user computing device 110 network identifier. For example, a user computing device 110 network identifier is "userdevice1." In an example, the access point device 130 generates a time stamp associated with a time of reception of the Wi-Fi signal data from the user computing device 110 and associates the time stamp with the user computing device 110 network identifier. For example, the time stamp comprises one or more of a month, a day of a month, a year, an hour of a day, a minute of an hour, a second of a minute, a millisecond of a second, and other appropriate measures of time. For example, the Wi-Fi signal data was received from user computing device 110 on Jun. 12, 2018 at 6:35:03 p.m. GMT and the time stamp reads "Jun. 12, 2018 18:35:03." In an example, the access point device 130 determines available Wi-Fi signal data at every time interval t. For example, time interval t is one second, two seconds, thirty seconds, one minute, two minutes, or other appropriate length of time interval t. Configuring a higher time interval t at which the access point device 130 determines available Wi-Fi signal data decreases an accuracy of location determination while configuring a lower time interval t at which the access point device 130 determines available Wi-Fi signal data increases the accuracy of location determination. For example, the time interval is one second and the access point device 130 receives Wi-Fi signal data from user computing devices 110 comprising network identifiers "userdevice1" and "userdevice2."

In block 420, the access point device 130 determines wireless signal attributes of the user computing device 110 based on the Wi-Fi signal data received from the user computing device 110. For example, the access point device 130 determines one or more of a received signal strength indicator ("RSSI"), an angle of arrival ("AoA"), a time of arrival ("TOA"), a time difference of arrival ("TDOA"), or other relevant wireless signal attributes. In an example, determining a wireless signal attribute comprises determining a difference of phase values received at each antenna 137 (phase vector) of an antenna 137 array based on the Wi-Fi signal data received from the user computing device 110. In certain examples, the access point device 130 determines second wireless signal attributes from first wireless signal attributes. For example, the access point device 130 determines the AoA from the phase vector data. For example, the access point device 130 receives Wi-Fi signal data from the user computing device 110 identified by user computing device 110 network identifier "userdevice1." In this example, the access point device 130 determines that the received Wi-Fi signal data broadcast by the user computing device 110 comprises a phase vector comprising thirty two phase values measured at thirty two circular array antennas of the access point device 130. In this example, the phase vector may comprise another appropriate number of phase values measured at a corresponding number of circular array antennas of the access point device 130. In an example, the access point device 130 determines n=i phase vector values comprising $[n_1, n_2, \ldots n_i]$, where the values are in the range $0<n<2\pi$, where $\pi=3.14159$. For example, the access point device 130, based on the received Wi-Fi signal data, determines n phase vector values comprising [0.5, 0.6, . . . 0.57]. Each phase value represents a phase that the signal arrives at a particular antenna of a circular antenna array of the access point device 130. In certain examples, the antenna array may comprise another appropriate antenna array configuration other than a circular antenna array. In an example, the access point device 130 determines, based on the determined phase vector data, an angle of arrival ("AoA") of the received Wi-Fi signal data broadcast by the user computing device 110. In an example, the AoA may be expressed in radians, degrees, or other appropriate angular measure. For example, the access point device 130 determines, based on the determined phase vector data for the received Wi-Fi signal data broadcast by the user computing device 110, an AoA of 1.4 radians. In an example, the access point device 130 determines, based on the received Wi-Fi signal data broadcast by the user computing device 110, a received signal strength indicator ("RSSI") of −40 dBm. In an example, RSSI values range between −120 dBm to 0 dBm, 0 dBm indicating the strongest received signal strength and −120 dBm indicating the weakest received signal strength.

In block 430, the access point device 130 transmits the wireless signal attributes of the user computing device 110 to the location determination system 140 via the network 120. For example, the access point device 130 transmits the determined wireless signal attributes of the user computing device 110, the logged time stamp, and the user computing device 110 network identifier to the location determination system 140 via the network 120. Example wireless signal attributes comprise one or more of the phase vector data, the AoA, and the RSSI determined from the received Wi-Fi signal data broadcast by the user computing device 110. Example wireless signal attributes further comprise the user computing device 110 network identifier. Example wireless signal attributes further comprise an access point device 130 identifier associated with the access point device 130. For example, the access point device 130 transmits wireless signal attributes comprising "Jun. 12, 2018 18:35:03, userdevice1, RSSI=−40, AoA=1.2" via the network 120 to the location determination system 140. In an example, the access point device 130 also transmits an access point device 130 network identifier, for example, "ap1," to the location determination system 140 via the network 120 as part of the wireless signal attributes data. For example, the access point device 130 transmits wireless signal attributes data including the access point device 130 network identifier, comprising "Jun. 12, 2018 18:35:03, userdevice1, RSSI=−40, AoA=1.2, ap1." In an example, the access point device 130 includes the phase vector data as part of the wireless attributes data. For example, the access point device 130 transmits wireless signal attributes data comprising "Jun. 12, 2018 18:35:03, userdevice1, RSSI=−40, AoA=1.2, [0.13, 0.15, 0.35 . . . 0.57]," where [0.13, 0.15, 0.35 . . . 0.57] comprise phase vector values for each of n antennae of a circular antenna array of the access point device 130.

In block 440, the location determination system 140 receives the wireless signal attributes of the user computing device 110 via the network 120 from the access point device 130. In an example, the location determination system 140 comprises a location determination component 143 that stores received wireless signal attributes in a database in a data storage unit 145 accessible to the location determination component 143. In an example, the location determination component 143 stores the wireless signal attributes according to user computing device 110 network identifier and access point device 130 network identifier. For example, the location determination system 140 receives the wireless signal attributes of the user computing device 110 from the access point device 130 comprising "Jun. 12, 2018 18:35:03, userdevice1, RSSI=−40, AoA=1.2, ap1" and stores the received wireless signal attributes "RSSI=−40," "AoA=1.2," a time "Jun. 12, 2018 18:35:03" under the user computing device 110 network identifier "userdevice1" and under the access point device 130 network identifier "ap1." In examples, the location determination system 140 periodically or continuously receives, via the network 120, subsequent wireless signal attributes of the user computing device 110 from the access point device 130. For example, the location determination system 140 receives subsequent wireless signal attributes of the user computing device 110 every one second, every five seconds, or at another appropriate interval.

From block 440, the method 230 proceeds to block 240 in FIG. 2.

The example method 230 describes receiving Wi-Fi signal data of a single user computing device 110 from a single access point device 130. However, in an example, the location determination system 140 receives wireless signal attributes of multiple user computing devices 110 at the enterprise location from multiple access point devices 130 at the enterprise location using the example method 230. In an example, the location determination system 140 receives wireless signal attributes of multiple user computing devices 110 at the enterprise location from multiple access point devices 130 periodically over subsequent time intervals at the enterprise location using the example method 230. In certain examples, each of the multiple access point devices 130 is synchronized to transmit, at each subsequent time interval, wireless signal attributes of one or more user computing devices 110 for which the respective access point device 130 received Wi-Fi signal data over the previous time interval. An example time interval comprises one second, two seconds, five seconds, or other appropriate time interval.

Returning to FIG. 2, in block 240, the location determination system 140 receives wireless signal attributes of the user computing device 110 from one or more access point devices 130 over the next time window. In an example, the location determination system 140 receives wireless signal attributes of multiple user computing devices 110 at the enterprise location from multiple access point devices 130 at the enterprise location using the example method 230. In this example, each access point device 130 transmits wireless signal attributes of one or more user computing devices 110 to the location determination system 140 using the example method 230. In this example, the location determination system 140 logs the received wireless signal attributes in the database according to user computing device 110 network identifier and access point device 130 network identifier. Further, in an example, the location determination system 140 organizes, in the database, the wireless signal attribute data associated with a particular user computing device 110 network identifier according to time stamp.

In block 250, the location determination system classifies the user computing device 110 as stationary or moving over the current time window. The method 250 to determine, by a location determination system 140, a motion classification of a user computing device 110 based on wireless signal data of the user computing device 110 over a time window is described in more detail hereinafter with reference to the method described in FIG. 5. In an example, a current time window comprises one or more time intervals for which wireless signal data of one or more user computing devices 110 is received from one or more access point devices 130 from the enterprise location via the network 120.

The example method 250 describes a location determination system 140 determining a motion classification for a single user computing device 110 at the enterprise location based on wireless signal attribute data of the user computing device 110 received from one or more access point devices 130 at the enterprise location over a current time window. In certain examples, the location determination system 140 determines a motion classification for two or more user computing devices 110 at the enterprise location based on wireless signal attribute data of the two or more user computing devices 110 received from one or more access point devices 130 at the enterprise location over the current time window. For example, as previously discussed, in an example, the location determination system 140 receives wireless signal attributes of multiple user computing devices 110 at the enterprise location from multiple access point devices 130 at the enterprise location using the example method 230. In this example, each access point device 130 transmits wireless signal attributes of one or more user computing devices 110 to the location determination system 140 using the example method 230. In this example, the location determination system 140 logs the received wireless signal attributes in the database according to user computing device 110 network identifier and access point device 130 identifier.

Figure 5:
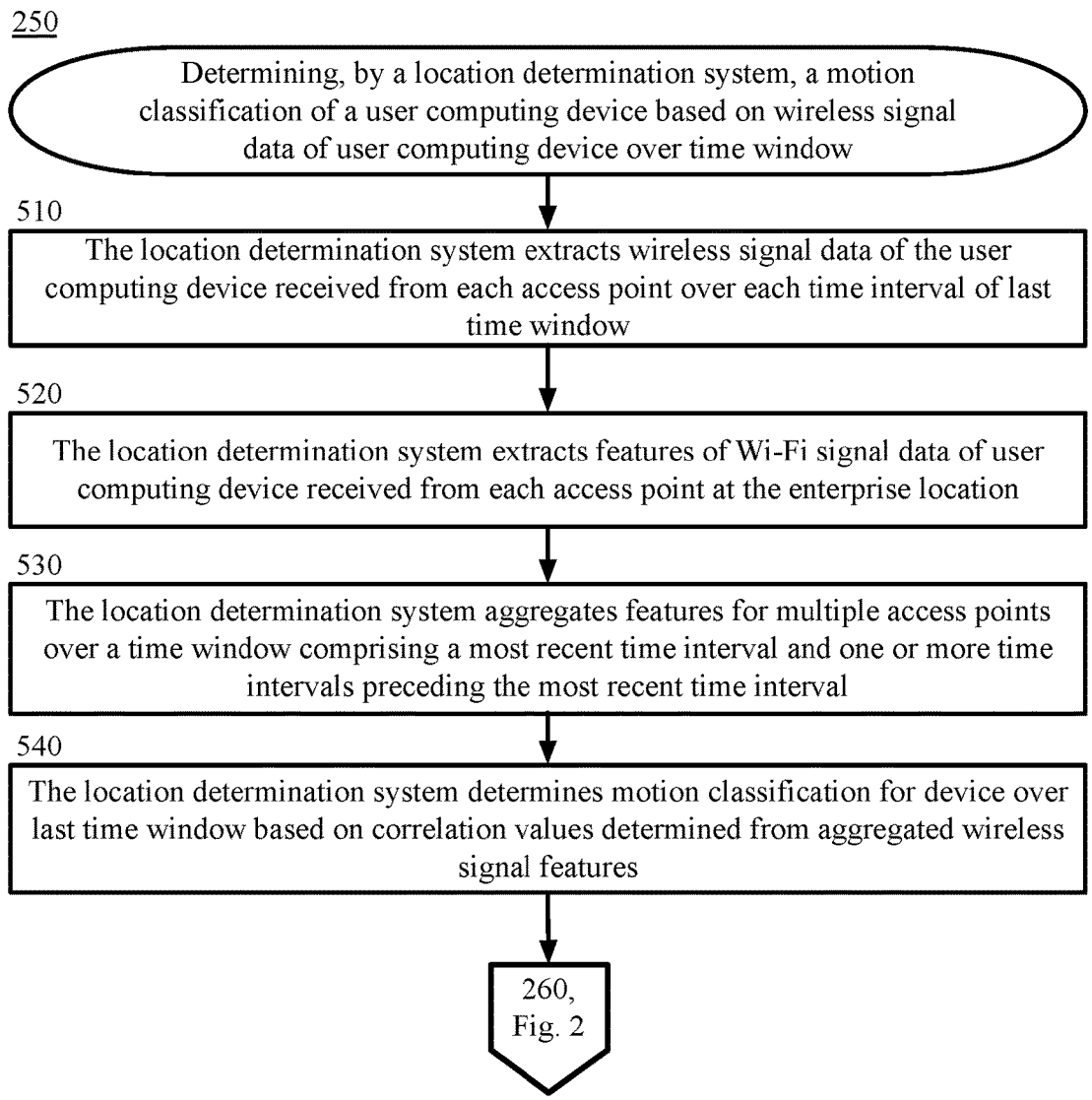
FIG. 5 is a block flow diagram depicting a method to determine, by a location determination system, a motion classification of a user computing device based on wireless signal attributes of a user computing device over a time window, in accordance with certain examples.

FIG. 5 is a block diagram depicting a method 250 to determine, by a location determination system 140, a motion classification of a user computing device 110 based on wireless signal data of the user computing device 110 over a time window, in accordance with certain examples. The method 250 is described with reference to the components illustrated in FIG. 1.

In block 510, the location determination system 140 extracts wireless signal data of user computing device 110 received from each access point device 130. For example, the location determination component 143 retrieves, from the database in the data storage unit 145, all wireless signal attribute data associated with a particular user computing device 110 network identifier at various time points and organizes the retrieved wireless signal attribute data of the user computing device 110 according to access point device 130 network identifier and/or according to time stamp. For example, the organized data comprises, for a single user computing device 110 associated with user computing device 110 network identifier "userdevice1" over example time window 18:35:10-18:35:20 at five second time intervals:

"userdevice1, ap1, 18:35:10, RSSI=−40, [phase vector data 1,]"

"userdevice1, ap1, 18:35:15, RSSI=−39, [phase vector data 2,]"

"userdevice1, ap1, 18:35:20, RSSI=−14, [phase vector data 3,]"

"userdevice1, ap2, 18:35:10, RSSI=−12, [phase vector data x,]"

"userdevice1, ap2, 18:35:15, RSSI=−13, [phase vector data y,]"

"userdevice1, ap2, 18:35:20, RSSI=−12, [phase vector data z.]"

Figure 6:
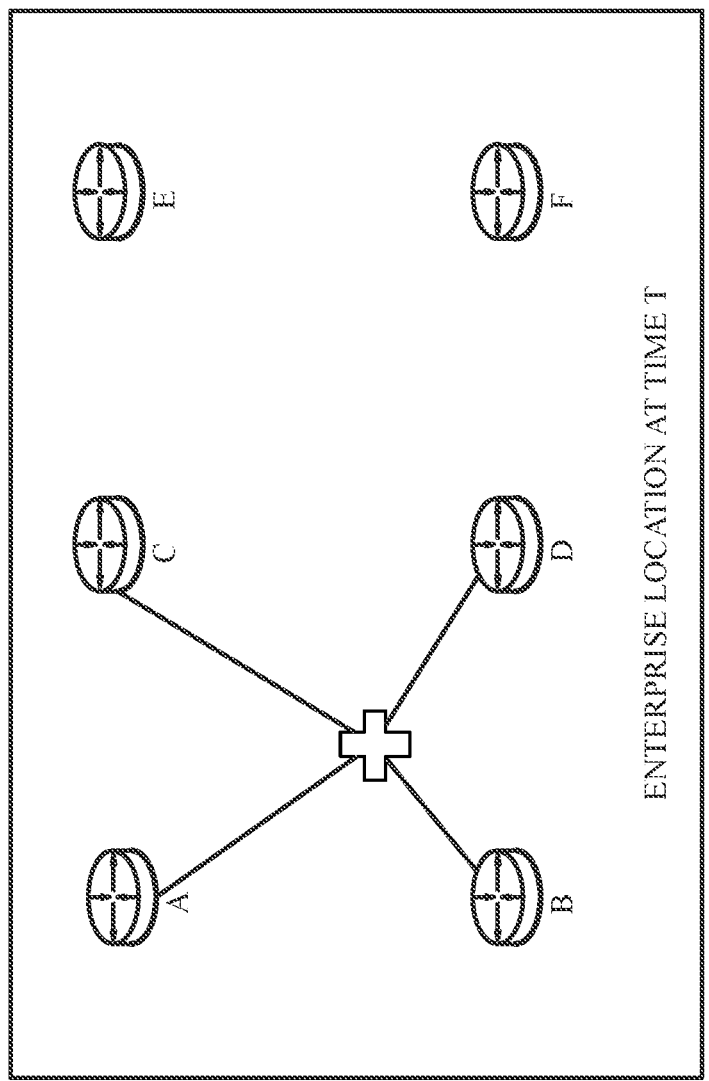
FIG. 6 is a diagram illustrating an example user computing device and an example configuration of multiple access point devices at an example enterprise location at a time T, in accordance with certain examples.
Figure 7:
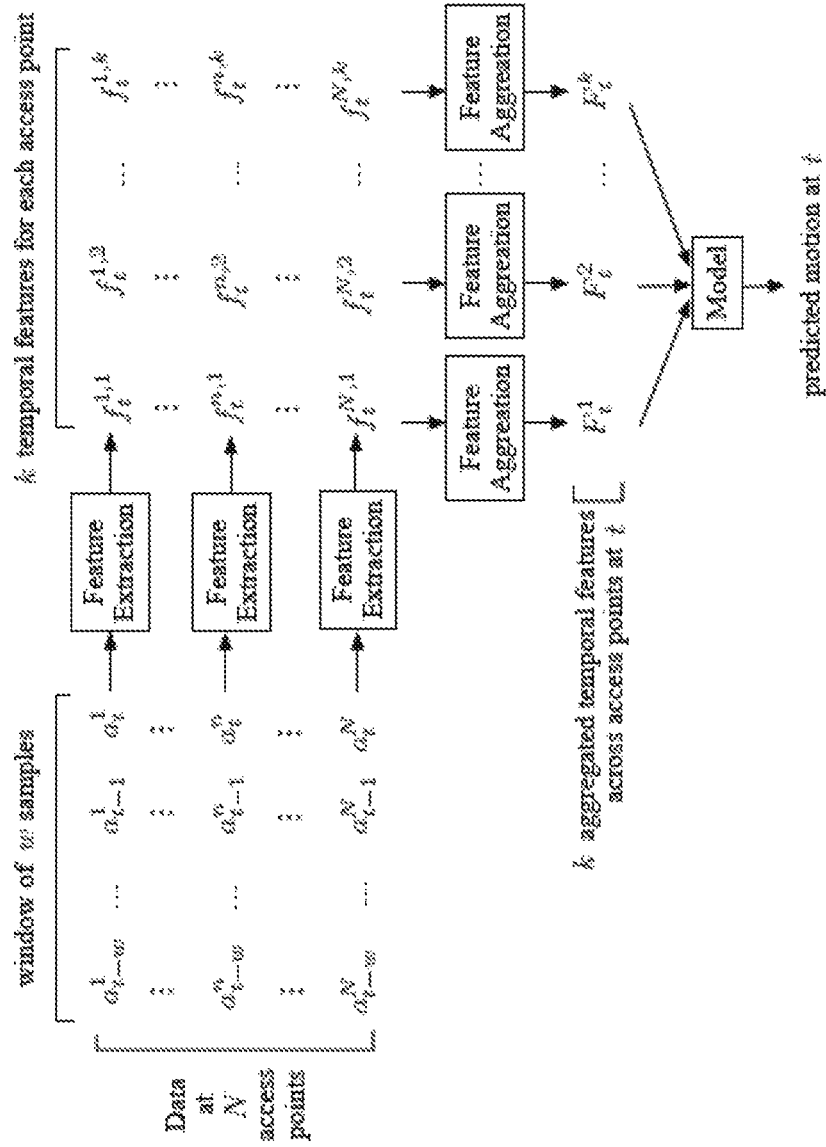
FIG. 7 is a diagram illustrating an example method to extract features from Wi-Fi signal data received at multiple access points, in accordance with certain examples.

In this example, each of example phase vector data 1, phase vector data 2, phase vector data 3, phase vector data x, phase vector data y and phase vector data z comprises phase values detected for the user computing device 110 Wi-Fi signal data at a time associated with a particular time stamp for each antenna of a circular array of antennas of the access point device 130. In certain examples, the wireless signal data for the user computing device 110 is organized differently, for example, first according to time stamp and then according to access point device 130 identifier. In certain examples, the location determination system 140 does not have wireless signal data for all user computing devices 110 for every access point device 130 network identifier or at every time interval t. For example, not every access point device 130 may receive Wi-Fi signal data from a user computing device 110 at any particular time interval t, as shown in FIG. 6. For example, an access point device 130 may not be able to determine an RSSI, one or more phase vector values of phase vector data, or an AoA based on Wi-Fi signal data broadcast by the user computing device 110 for each time interval of the current time window. In another example, the access point device 130 does not receive Wi-Fi signal data from the user computing device 110 for one or more of the time intervals of the current time window.

In another example, the location determination system 140 extracts, for each time interval over time window w, wireless signal data for a particular user computing device 110 network identifier for a particular access point device 130. For example, the location determination system 140 extracts, for a user computing device 110 corresponding to network identifier "userdevice1" for wireless signal data received from access point devices 130 corresponding to network identifiers "ap2," "ap3," and "ap5," the following wireless signal data:

"userdevice1, ap2, 18:35:15, RSSI=−40, [phase vector data y,]"

"userdevice1, ap2, 18:35:20, RSSI=−35, [phase vector data z.]"

"userdevice1, ap3, 18:35:15, RSSI=−40, [phase vector data a,]"

"userdevice1, ap3, 18:35:20, RSSI=−35, [phase vector data b.]"

"userdevice1, ap5, 18:35:15, RSSI=no data, [no phase vector data,]"

"userdevice1, ap5, 18:35:20, RSSI=−35, [phase vector data n.]"

In this example, access point device 130 labeled "ap5" did not transmit any wireless signal data to the location determination system 140 at time 18:35:15.

FIG. 6 is a diagram illustrating an example user computing device 110 and an example configuration of multiple access point devices 130 at an example enterprise location at a time T. FIG. 6 shows an example user computing device 110 and six example access point devices 130 labeled A, B, C, D, E, and F at various positions within an enterprise location at time T. In this example illustration, the user computing device 110 location is such that only access point devise A, B, C, D receive Wi-Fi signal data broadcast by the user computing device via Wi-Fi communication channels 105 at time T. In this example illustration, access point devices E and F do not receive Wi-Fi signal data of the user computing device 110 at time T. For example, access point devices E and F are not within a predefined threshold range necessary to receive Wi-Fi signal data from user computing device 110 at time T while access point devices A, B, C, and D are within the predefined threshold range. In another example, one or more of access point devices E and F are disabled or otherwise do not receive Wi-Fi signal data from the user computing device 110 via Wi-Fi communication channels.

Returning to FIG. 5, in block 520, the location determination system 140 extracts features of the wireless signal data of the user computing device 110 received from each access point device 130 at the enterprise location.

As previously discussed, in an example, each access point device 130 at the enterprise location is configured to communicate wireless signal data to the location determination system 140 via the network 120. Each access point device 130 receives Wi-Fi signal data from each of one or more user computing devices 110 via wireless communication channels 105 at each time interval t over a time window w, determines wireless signal attributes data based on the received Wi-Fi signal data, and transmits the determined wireless signal attributes data to the location determination system 140 via the network 120. For example, time interval t is one second, two seconds, thirty seconds, one minute, two minutes, or other appropriate length of time interval t. Configuring a higher time interval t at which the access point device 130 determines available Wi-Fi signal data decreases an accuracy of location determination while configuring a lower time interval t at which the access point device 130 determines available Wi-Fi signal data increases the accuracy of location determination.

In an example, the location determination system 140 aggregates wireless signal features for one or more access point devices 130 describing wireless signal features for a user computing device 110 between the most recent time interval, t, and one or more previous time intervals. For example, the location determination system 140 aggregates wireless signal features associated with a particular user computing device 110 for access point devices 130 over one or more of time intervals t, t-1, t-2, t-3, t-4, t-5, t-6, t-7, t-8, t-9, and t-10. In this example, the location determination system 140 may not have one or more wireless signal features for one or more access point device 130 network identifiers for one or more of the time intervals t, t-1, t-2, t-3, t-4, t-5, t-6, t-7, t-8, t-9, and t-10.

In certain examples, the location determination system 140 selectively chooses wireless signal attributes (RSSIs, phase vectors) from wireless signal data in a time window measured at each access point device 130 to compute features from the attributes. For example, the location determination system 140 receives wireless signal attributes (phase vectors) p(t), p(t-1), p(t-2), p(t-3) from an access point device 130 for a time window comprising four time intervals t, t-1, t-2, t-3. For example, an access point device 130 has eight antennas in a circular antenna array and each phase vector has eight phase values, where "NA" denotes an unmeasured phase value:

p(t)=[NA, 0.5, NA, 1.2, 1.2, 2.4, NA, 1.1]
p(t-1)=[3.2, 0.4, NA, 1.1, NA, 2.4, NA, NA]
p(t-2)=[NA, 0.3, NA, 1.3, 1.2, 2.1, NA, NA]
p(t-3)=[NA, NA, NA, NA, 1.2, 2.4, NA, 1.1]

In this example, comparing phase values measured by the access point device 130 at p(t-1) and p(t), the access point device 130 measured phase vector values at both p(t-1) and p(t) at three antennas: antennas 2, 4, and 6. Comparing phase values measured by the access point device 130 at p(t-2) and p(t), the access point device 130 measured phase vector values at both p(t-2) and p(t) at four antennas: antennas 2, 4, 5, and 6. Comparing phase values measured by the access point device 130 at p(t-3) and p(t), the access point device 130 measured phase vector values at both p(t-3) and p(t) at three antennas: antennas 5, 6, and 8. In this example, the threshold number of phase values measured at the same antennas at the access point 130 is four antennas to guarantee a high certainty of phase vector correlation value. Therefore, in this example, the wireless signal attributes from time intervals t and t-2 are considered in computing the phase correlation. In some examples, the location determination system 140 normalizes the phase correlation with the number of phase values measured at the corresponding antennas for which phase values were measured for the selected time intervals.

In an example, the location determination system 140 calculates a correlation value one or more of the features for the wireless signal data, for example, one or more of RSSI values, AoA values, phase vector data, and other data computed from the wireless signal data between current time interval t and time interval t-1 (the previous time interval). In another example, the location determination system 140 calculates a correlation between one or more features for one or more previous time intervals and the most recent time interval, for example, for one or more of t-6, t-5 t-4, t-3, t-2, and t-1. For example, a correlation represents a similarity between the wireless signal features from two or more previous time intervals and the latest time interval for which wireless signal attributes have been determined.

In an example, the phase vector correlation value may be determined as follows: $\text{Corr}(\text{phases}_t^n, \text{phases}_{t'}^n) = \Sigma e^{2\pi j(\text{phases}_t^n \cdot \text{phases}_{t'}^n)}$, which determines the correlation between the phase vector data for one or more previous time interval, $\text{phases}_{t'}^n$, and the phase vector data for the latest available time interval, $\text{phases}_t^n$. Other formulas may be used to calculate correlation values for the wireless signal features. In another example, to determine correlation, the location determination system 140 may compare aggregated RSSI values for the selected previous time intervals and the latest time interval for which wireless signal data have been determined for a user computing device 110. In yet another example, the location determination system 140 determines the absolute difference between aggregated RSSIs measured for two or more previous time intervals and the latest time interval. In this example, if no aggregated RSSI data is determined for one or more of the time intervals, that time interval will not be considered when determining correlation. In yet another example, the location determination system 140 determines absolute differences between successive aggregated RSSIs determined for two or more previous time intervals and the latest available time interval within the time window and then computes the standard deviation of these differences. In yet another example, the location determination system 140 determines a correlation value comprising a ratio between a number of time intervals comprising available aggregated RSSIs and the number of time intervals being considered in the time window.

In block 530, the location determination system 140 aggregates wireless signal features for multiple access point devices 130 over a time window comprising a most recent time interval and one or more time intervals preceding the most recent time interval. In an example, the location determination system 140 determines one or more phase vector correlations from each of one or more access point devices 130 over a time window. The location determination system 140 determines an aggregated phase vector correlation comprising the maximum of the one or more phase vector correlations determined for the one or more access point devices 130.

In another example, the location determination system 140 determines consecutive RSSIs at each of one or more access point devices 130 over a time window and determines an aggregated feature comprising a Pearson correlation of these pairs of consecutive RSSIs given multiple values of this feature extracted from multiple access point devices 130. In this example, a consecutive RSSI comprises a pair of RSSIs measured at the current time interval t and a previous time interval t-1 at an access point device 130. In another example, the location determination system 140 determines an absolute difference between consecutive RSSIs measured at each of one or more access point devices 130 over a time window and the location determination system 140 determines an aggregated feature comprising an average of these determined absolute differences. In another example, the location determination system 140 determines a standard deviation of RSSIs measured at each of one or more access point devices 130 over a time window and the location determination system 140 determines an aggregated feature comprising an average of these determined standard deviations. In another example, the location determination system 140 determines differences between successive RSSIs in the time window for each of the one or more access point devices 130 and then computes an aggregated feature comprising the average of the standard deviations of the determined differences. In yet another example, the location determination system 140 determines a number of available RSSIs for each of the one or more access point devices 130 over the time window and the location determination system 140 determines an aggregated feature comprising a ratio between the number of available RSSIs and the time window size.

In block 540, the location determination system 140 determines a motion classification for the user computing device 110 over the last time window based on the aggregated wireless signal features. For example, the location determination system 140 determines aggregated wireless signal features as previously described in block 530. In certain examples, the location determination system 140 determines an aggregated phase vector correlation and a higher aggregated phase vector correlation indicates that a user computing device 110 is more likely to be stationary over the time window. Conversely, a lower aggregated phase vector correlation indicates that a user computing device 110 is more likely to have moved over the time window. In this example, the location determination system 140 determines that the motion classification over the time window for a user computing device is "stationary" if the aggregated phase vector meets or exceeds a threshold value. In this example, the location determination system 140 determines that the motion classification over the time window for a user computing device is "moving" if the aggregated phase vector is below the threshold value.

In other examples, the location determination system 140 determines a Pearson correlation of consecutive RSSIs measured at one or more access point devices 130 over the time window and a higher Pearson correlation indicates that a user computing device 110 is more likely to be stationary over the time window. Conversely, a lower Pearson correlation indicates that a user computing device 110 is more likely to have moved over the time window. In this example, the location determination system 140 determines that the motion classification over the time window for a user computing device is "stationary" if the Pearson correlation meets or exceeds a threshold value. In this example, the location determination system 140 determines that the motion classification over the time window for a user computing device is "moving" if the Pearson correlation is below the threshold value.

In other examples, the location determination system 140 determines an absolute difference between consecutive RSSIs measured at each of one or more access point devices 130 over a time window. In these examples, a higher absolute difference indicates that the user computing device is more likely to be stationary over the time window. Conversely, a lower absolute difference indicates that the user computing device is more likely to have moved over the time window. In this example, the location determination system 140 determines that the motion classification over the time window for a user computing device is "stationary" if the absolute difference meets or exceeds a threshold value. In this example, the location determination system 140 determines that the motion classification over the time window for a user computing device is "moving" if the absolute difference is below the threshold value.

In other examples, the location determination system 140 determines an average of standard deviation of RSSIs measured at each of one or more access point devices 130 over a time window. In these examples, a higher average indicates that the user computing device is more likely to be stationary over the time window. Conversely, a lower average indicates that the user computing device is more likely to have moved over the time window. In this example, the location determination system 140 determines that the motion classification over the time window for a user computing device is "stationary" if the average meets or exceeds a threshold value. In this example, the location determination system 140 determines that the motion classification over the time window for a user computing device is "moving" if the average is below the threshold value.

In other examples, the location determination system 140 determines an average of standard deviations of differences between successive RSSIs in the time window for each of the one or more access point devices 130. In these examples, a higher average indicates that the user computing device is more likely to be stationary over the time window. Conversely, a lower average indicates that the user computing device is more likely to have moved over the time window.

In this example, the location determination system 140 determines that the motion classification over the time window for a user computing device is "stationary" if the average meets or exceeds a threshold value. In this example, the location determination system 140 determines that the motion classification over the time window for a user computing device is "moving" if the average is below the threshold value.

In yet other examples, the location determination system 140 determines a ratio between the number of available RSSIs and the time window size. In these examples, a higher ratio indicates that the user computing device is more likely to be stationary over the time window. Conversely, a lower ratio indicates that the user computing device is more likely to have moved over the time window. In this example, the location determination system 140 determines that the motion classification over the time window for a user computing device is "stationary" if the ratio meets or exceeds a threshold ratio. In this example, the location determination system 140 determines that the motion classification over the time window for a user computing device is "moving" if the ratio is below the threshold ratio.

Other example models may be used other than determining motion based on correlation values of aggregated features across access point devices 130. For example, the location determination system 140 may use a recurrent neural network (RNN), a random forest (RF), a support vector machine (SVM), or a hidden Markov model (HMM) to classify the user computing device 110 as moving or stationary based on applying the aggregated wireless signal features to the appropriate model. In an example end-to-end RNN approach, the RNN learns a temporal correlation of RSSIs and phase vector data to perform motion classification. This example end-to-end RNN comprises a RNN of LSTM blocks for each access point device 130 to capture a temporal correlation of RSSIs and phase vectors measured at the respective access point device 130. Further, in this example, the end-to-end RNN comprises a neuron that combines outputs from each RNN corresponding to the respective access point device 130 to predict a motion classification for the user computing device 110. In certain examples, the location determination system 140 may use one of the previously mentioned models to determine a correlation value over the time window and then determine a motion classification for the user computing device 110 based on the correlation value determined by the model.

Returning to FIG. 2, in block 260, the location determination system 140 classifies the user computing device 110 as stationary or moving over the current time window. As previously discussed, the location determination system 140, based on correlation values of aggregated wireless signal features associated with one or more access point devices 130 for a user computing device 110 over time window, classifies the user computing device 110 as either "moving" or "stationary." Correlation values indicate whether the device is moving. The more similar wireless signal data is from a current time interval to a previous time interval, the more likely it is that a user computing device 110 is stationary. Significant changes in the position of a user computing device 110, however, result in changes in wireless signal data received from multiple access point devices 130. RSSI, for example, an is an indication of signal strength and can be used as a proxy measure for distance of a user computing device 110 from an access point device 130 and significant changes in RSSI indicate movement of the user computing device 110 closer to or farther away from the access point device 130. AoA, for example, is an indication of an angular direction from which a wireless signal of the user computing device 110 is received with respect to the access point device 130 and changes in the AoA indicate movement of the user computing device 110 with respect to the access point device 130.

Further, as previously discussed, the location determination system 140 may, based on applying the aggregated wireless signal features to a recurrent neural network (RNN), a random forest (RF), a support vector machine (SVM), a hidden Markov model (HMM), or other appropriate model, classify the user computing device 110 as moving or stationary.

If the location determination system 140 classifies the user computing device 110 as stationary over the current time window, the method 200 returns to block 240, and the location determination system 140 receives wireless signal attributes of the user computing device 110 from the one or more access point devices 130 over the next time window. For example, if the location determination system 140 classifies a user computing device 110 as "stationary" over the current time window, the location determination system 140 does not calculate a position of the user computing device 110 and the method 240 is repeated. Not calculating a position of the user computing device 110 in response to a "stationary" classification and only in response to a "moving" classification results in reduced processing by the location determination system 140. In certain examples, one or more user computing devices 110 are determined to be "stationary" over the current time window and the location determination system 140 does not calculate a position for each of the respective user computing devices 110 classified as "stationary" over the current time window.

Returning to block 260, if the location determination system 140 classifies the user computing device 110 as moving over the current time window, the method 200 proceeds to block 270. For example, the location determination system 140 classifies a user computing device 110 as "moving" over the current time window.

In block 270, the location determination system 140 computes a user computing device 110 location for the current time window based on the wireless signal attributes received from the one or more access points. For example, if the location determination system 140 classifies a user computing device 110 as "moving" over the current time window, the location determination system 140 calculates a position of the user computing device 110 and the method 240 is repeated. Calculating a position of the user computing device 110 in response to a "moving" classification and not calculating a position of the user computing device 110 in response to a "stationary" classification results in reduced processing by the location determination system 140. In certain examples, one or more user computing devices 110 are determined to be "moving" over the current time window and the location determination system 140 calculates a position for each of the respective user computing devices 110 classified as "moving" over the current time window. In an example, the location determination system 140 calculates a position for the user computing device 110 using the most recent AoA and RSSI for the current time window or otherwise determines the position of the user computing device 110 based on the wireless signal attributes of the user computing device 110 received from one or more access point devices 130 via the network 120. In these examples, the location determination system 140 determines the AoA from the phase vector data.

In block 280, the location determination system 140 displays the current computed location of the user computing device 110 via a user interface. In an example, the location determination system 140 provides a display of most recently calculated locations of user computing devices 110 determined via the example method 200. In another example, the location determination system 140 transmits, via the network 120, an indication of position of one or more user computing devices 110 determined via the example method 200 to one or more computing devices. In an example, an operator of the location determination system 140 may interact with the user interface 111 display of most recently calculated positions of the one or more user computing devices 110 at the enterprise location. In certain examples, calculated positions of one or more user computing devices 110 may enable location based services such as assets location logging or zone notification. For example, the location determination system 140 may notify, via the network 120, a computing device associated with the enterprise location when a particular user computing device 110 enters a specific zone within the enterprise location.

In block 290, the location determination system 140 determines if further wireless signal attributes of the user computing device 110 have been received from the one or more access point devices 130. In certain examples, the user computing device 110 continues to broadcast Wi-Fi signal data at the enterprise location via wireless communication channels 105 and one or more access point devices 130 receive the broadcast Wi-Fi signal data and retransmit wireless signal features of the user computing device 110 to the location determination system 140 via the network 120. However, in another example, the user computing device 110 is out of Wi-Fi broadcast range of any access point devices 130 at the enterprise location and the location determination system 140 does not receive any further wireless signal features of the user computing device 110 via the network 120 from the one or more access point devices 130. In another example, the user 101 signs out of the application 113 on the user computing device 110 or otherwise powers off the user computing device 110 and the user computing device 110 ceases to broadcast Wi-Fi signal data.

If the location determination system 140 has received further wireless signal attributes of the user computing device 110 from the one or more access point devices 130, the method 200 proceeds to block 240, and the location determination system 140 receives wireless signal attributes of the user computing device 110 from the one or more access point devices 130 over the next time window. For example, the location determination system 140 determines a "moving" or "stationary" classification and calculates a new position in response to determining a "moving" classification or does not calculate a new position in response to determining a "stationary" classification of the user computing device 110 based on the example method 200.

Returning to block 290, if the location determination system 140 has not received further wireless signal attributes of the user computing device 110 from the one or more access points, the method 200 proceeds to block 340 in FIG. 3. For example, in FIG. 3, in block 340, the user signs into the application 113 on the user computing device 110 at the enterprise location. For example, the user 101 signs out of the application 113 or otherwise powers off the user computing device 110, leaves the enterprise location, returns the next day to the enterprise location, and signs in to the application 113 on the user computing device 110.

Other Examples

FIG. 8 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different examples, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A method to determine positions of user computing devices based on wireless signal data and motion classification, comprising:
    receiving, by one or more computing devices and from one or more access point computing devices, wireless signal data associated with a user computing device for a time window comprising at least a first time interval and one or more second time intervals preceding the first time interval;
    for each of the one or more access point computing devices:
        extracting, by the one or more computing devices, one or more features of the wireless signal data associated with the user computing device at the first time interval and at the one or more second time intervals preceding the first time interval;
    determining, by the one or more computing devices, an aggregated feature based on the extracted one or more features of the wireless signal data received from the one or more access point computing devices;
    classifying, by the one or more computing devices, the user computing device as moving based on the determined aggregated feature, and
    in response to classifying the user computing device as moving, determining, by the one or more computing devices, a position of the user computing device based on the received wireless signal data; and
    transmitting, by the one or more computing devices to a second computing device, the determined position of the user computing device for display via the second computing device.

2. The method of claim 1, wherein the wireless signal data comprise one or more of a received signal strength indicators and phase vectors.

3. The method of claim 2, further comprising determining, by the one or more computing devices, an angle of arrival based on the received phase vectors and wherein the position of the user computing device is determined based on the determined angle of arrival and the received signal strength indicators.

4. The method of claim 1, wherein the wireless signal data comprises one or more of Wi-Fi signal data, Bluetooth signal data, Bluetooth low energy ("BLE") signal data, and near field communication ("NFC") signal data.

5. The method of claim 1, further comprising, determining, by the one or more access point devices, the wireless signal data based on data received from the user computing device via one or more wireless communication channels.

6. The method of claim 1, wherein the one or more features of the wireless signal data comprise phase vector correlations.

7. The method of claim 1, wherein the one or more features of the wireless signal data comprise a difference in consecutive received signal strength indicators, a standard deviation of received signal strength indicators, a standard deviation of the difference in consecutive received signal strength indicators, or a ratio between a number of available received signal strength indicators and a total number of the first time interval and the second time intervals.

8. The method of claim 1, wherein classifying the user computing device as moving further comprises applying the received wireless signal data to a model comprising one or more of a recurrent neural network, a random forest, a support vector machine, and a hidden Markov model.

9. A computer program product, comprising:
    a non-transitory computer-readable storage device having computer-executable program instructions embodied therein that when executed by a computer cause the computer to determine positions of user computing devices based on wireless signal data and motion classification, the computer-readable program instructions comprising:
    computer-readable program instructions to receive, from one or more access point computing devices, wireless signal data associated with a user computing device for a time window comprising at least a first time interval and one or more second time intervals preceding the first time interval;
    computer-readable program instructions to extract, for each of the one or more access point computing device, one or more features of the wireless signal data associated with the user computing device at the first time interval and at the one or more second time intervals preceding the first time interval;
    computer-readable program instructions to determine an aggregated feature based on the extracted one or more features of the wireless signal data received from the one or more access point computing devices;

computer-readable program instructions to classify the user computing device as moving based on the determined aggregated feature, and computer-readable program instructions to determine, in response to classifying the user computing device as moving, a position of the user computing device based on the received wireless signal data; and computer-readable program instructions to transmit, to a second computing device, the determined position of the user computing device for display via the second computing device.

10. The computer program product of claim 9, wherein the one or more wireless signal data comprise one or more of a received signal strength indicator and phase vectors.

11. The computer program product of claim 10, further comprising computer-readable program instructions to determine an angle of arrival based on the received phase vectors and wherein the position of the user computing device is determined based on the determined angle of arrival and the received signal strength indicators.

12. The computer program product of claim 9, wherein the wireless signal data comprises one or more of Wi-Fi signal data, Bluetooth signal data, Bluetooth low energy ("BLE") signal data, near field communication ("NFC") signal data.

13. The computer program product of claim 9, wherein the one or more access point devices determine the wireless signal data based on data received from the user computing device via one or more wireless communication channels.

14. The computer program product of claim 9, wherein the one or more features of the wireless signal data comprise phase vector correlations.

15. The computer program product of claim 9, wherein the one or more features of the wireless signal data comprise a difference consecutive received signal strength indicators, a standard deviation of received signal strength indicators, a standard deviation of the difference in consecutive received signal strength indicators, or a ratio between a number of available received signal strength indicators and a total number of the first time interval and the second time intervals.

16. A system, comprising:
a processor adapted to execute one or more processes; and
a memory configured to store a process executable by the processor, the process when executed operable to:
receive, from one or more access point computing devices, wireless signal data associated with a user computing device for a time window comprising at least a first time interval and one or more second time intervals preceding the first time interval;
for each of the one or more access point computing devices:
extract, for each access point computing device, one or more features of the wireless signal data associated with the user computing device at the first time interval and at the one or more second time intervals preceding the first time interval;
determine an aggregated feature based on the extracted one or more features of the wireless signal data received from the one or more access point computing devices;
classify the user computing device as moving based on the determined aggregated feature, and
determine, in response to classifying the user computing device as moving, a position of the user computing device based on the received wireless signal data;
and transmit, to a second computing device, the determined position of the user computing device to the second computing device.

17. The system of claim 16, wherein the one or more features of the wireless signal data comprise one or more of a received signal strength indicators and phase vectors.

18. The system of claim 16, wherein the one or more features of the wireless signal data comprises one or more of Wi-Fi signal data, Bluetooth signal data, Bluetooth low energy ("BLE") signal data, near field communication ("NFC") signal data.

19. The system of claim 16, wherein the one or more access point devices determine the wireless signal data based on data received from the user computing device via one or more wireless communication channels.

20. The system of claim 16, wherein classifying the user computing device as moving further comprises applying the aggregated wireless signal features to a model comprising one or more of a recurrent neural network, a random forest, a support vector machine, and a hidden Markov model.

* * * * *